United States Patent
Eggebraaten et al.

(10) Patent No.: US 8,639,495 B2
(45) Date of Patent: Jan. 28, 2014

(54) NATURAL LANGUAGE PROCESSING ('NLP')

(75) Inventors: Thomas J. Eggebraaten, Rochester, MN (US); Richard J. Stevens, Rochester, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/343,121

(22) Filed: Jan. 4, 2012

(65) Prior Publication Data

US 2013/0173249 A1 Jul. 4, 2013

(51) Int. Cl.
*G06F 17/28* (2006.01)
(52) U.S. Cl.
USPC .............................. 704/9; 704/257; 704/270
(58) Field of Classification Search
USPC ............ 704/1–10, 251, 255, 257, 270, 270.1; 707/100, 711; 706/14
See application file for complete search history.

(56) References Cited

U.S. PATENT DOCUMENTS

| | | | |
|---|---|---|---|
| 7,526,425 B2 * | 4/2009 | Marchisio et al. | 704/9 |
| 7,570,262 B2 | 8/2009 | Landau et al. | |
| 7,853,544 B2 | 12/2010 | Scott et al. | |
| 8,001,064 B1 * | 8/2011 | Rennison | 706/14 |
| 2006/0095440 A1 * | 5/2006 | Dettinger et al. | 707/100 |
| 2007/0067320 A1 | 3/2007 | Novak | |
| 2011/0004588 A1 * | 1/2011 | Leitersdorf et al. | 707/711 |

OTHER PUBLICATIONS

Ferrucci et al., "UIMA: An Architectural Approach to Unstructured Information Processing in the Corporate Research Environment," Journal of Natural Language Engineering, Jun. 2004, pp. 1-26, vol. 10, issue 3-4, Cambridge University Press, New York, NY, USA.
TAN, "Text Mining: The State of the Art and the Challenges," In proceedings, PAKDD Workshop on Knowledge Discovery from Advanced Databases (KDAD'99) in conjunction with Third Pacific-Asia Conference on Knowledge Discovery and Data Mining (PAKDD'99), Apr. 1999, pp. 71-76, Beijing, China.

* cited by examiner

*Primary Examiner* — Huyen X. Vo
(74) *Attorney, Agent, or Firm* — Biggers Kennedy Lenart Spraggins, LLP (57) ABSTRACT

Natural language processing ('NLP') including: receiving text specifying predetermined evidence; receiving a text passage to process, the text passage including conditions and logical operators, the text passage comprising criteria for evidence; decomposing the text passage into coarse grained text fragments, including grouping text segments in dependence upon the logical operators; analyzing each coarse grained text fragment to identify conditions; evaluating each identified condition in accordance with the predetermined evidence and predefined condition evaluation rules; evaluating each coarse grained text fragment in dependence upon the condition evaluations and the logical operators; and calculating, in dependence upon the evaluations of each text fragment, a truth value indicating a degree to which the evidence meets the criteria of the text passage.

11 Claims, 6 Drawing Sheets

1: Gene expression profiling as a technique of managing the treatment of cancer is considered medically
2: necessary when all of the following criteria are met:
3:
4: Individual has had surgery and full pathological evaluation of the specimen has been completed; and
5:
6: Histology:
7: Ductal; or
9: Lobular; or
10: Mixed; or
11: Metaplastic; and
12: NOT tubular or colloid and
13:
14: Estrogen receptor positive (ER+), or progesterone receptor positive (PR+), or both; and
15: HER2 receptor negative; and
16:
17: pN0 (node negative) or pN1mi with axillary lymph node micrometastasis less than or equal to 2mm; and
18:
19: Any of the following:
20:
21: Tumor size 0.6-1.0 cm moderate/poorly differentiated; or
22: Tumor size 0.6-1.0 cm and well-differentiated with any of the following unfavorable features:
23: angiolymphatic invasion, or
24: high nuclear grade, or
25: high histologic grade; or
26: Tumor greater than 1.0 cm and less than or equal to 4.0 cm; and
27:
28: Not a pT4 lesion; and
29:
30: Chemotherapy is a therapeutic option being considered and will be supervised by the practitioner ordering the
31: gene expression profile.

Text Passage 130

NATURAL LANGUAGE PROCESSING ('NLP')

BACKGROUND OF THE INVENTION

1. Field of the Invention

The field of the invention is data processing, or, more specifically, methods, apparatus, and products for natural language processing ('NLP').

2. Description of Related Art

Technologies configured to derive knowledge from unstructured data and use that knowledge to advise on matters spanning a broad set of use cases from a number of different industries are becoming more common. These technologies generally rely on ingesting a large amount of unstructured data, the ability to gain knowledge and understanding from that data, and the subsequent use of that knowledge and understanding to provide an answer with a level of confidence to various questions over that evidence source domain. Such technologies generally operate by generating a large number of hypotheses (candidate answers for a particular question) and then scoring the likelihood that each hypothesis is a correct answer using a variety of natural language processing techniques. Techniques for scoring candidate answers are typically an assortment of natural language processing algorithms that take into account various parameters, such as, how well the terms found in an answer match those in the question, whether the candidate answer is expressed in the same logical form as the question, whether the candidate answer is of the same lexical answer type as that expected by the question, and a number of other techniques that involve analysis of unstructured text. These techniques work well when finding answers to questions based on alignment of a set of facts, but are less effective in dealing with unstructured data which is very criteria oriented. An example of such unstructured data that is criteria oriented includes a set of guidelines used to approve or deny reimbursement from a medical insurance company to an insured patient for a specific medical procedure. This type of unstructured data typically contains a number of conjunctions indicating that either a list of conditions must all be true for a given guideline to apply or that any member of a list of conditions is sufficient for the guidelines to apply. That is, this type of unstructured data includes various logical operates that join various condition or criteria into a single test or criterion.

SUMMARY OF THE INVENTION

Methods, apparatus, and products for natural language processing ('NLP') are disclosed in this specification. Such NLP includes: receiving, by an NLP module, text specifying predetermined evidence; receiving, by the NLP module, a text passage to process, the text passage including conditions and logical operators, the text passage comprising criteria for evidence; decomposing, by the NLP module, the text passage into coarse grained text fragments, including grouping text segments as coarse grained text fragments in dependence upon the logical operators; analyzing, by the NLP module, each coarse grained text fragment to identify conditions within the coarse grained text fragment; evaluating, by the NLP module, each identified condition in accordance with the predetermined evidence and predefined condition evaluation rules; evaluating, by the NLP module, each coarse grained text fragment in dependence upon the identified condition evaluations and the logical operators of the coarse grained text fragment; and calculating, by the NLP module in dependence upon the evaluations of each coarse grained text fragment, a truth value indicating a degree to which the evidence meets the criteria of the text passage.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 sets forth an example text passage to be processed by natural language processing according to embodiments of the present invention.

DETAILED DESCRIPTION OF EXEMPLARY EMBODIMENTS

Figure 1:
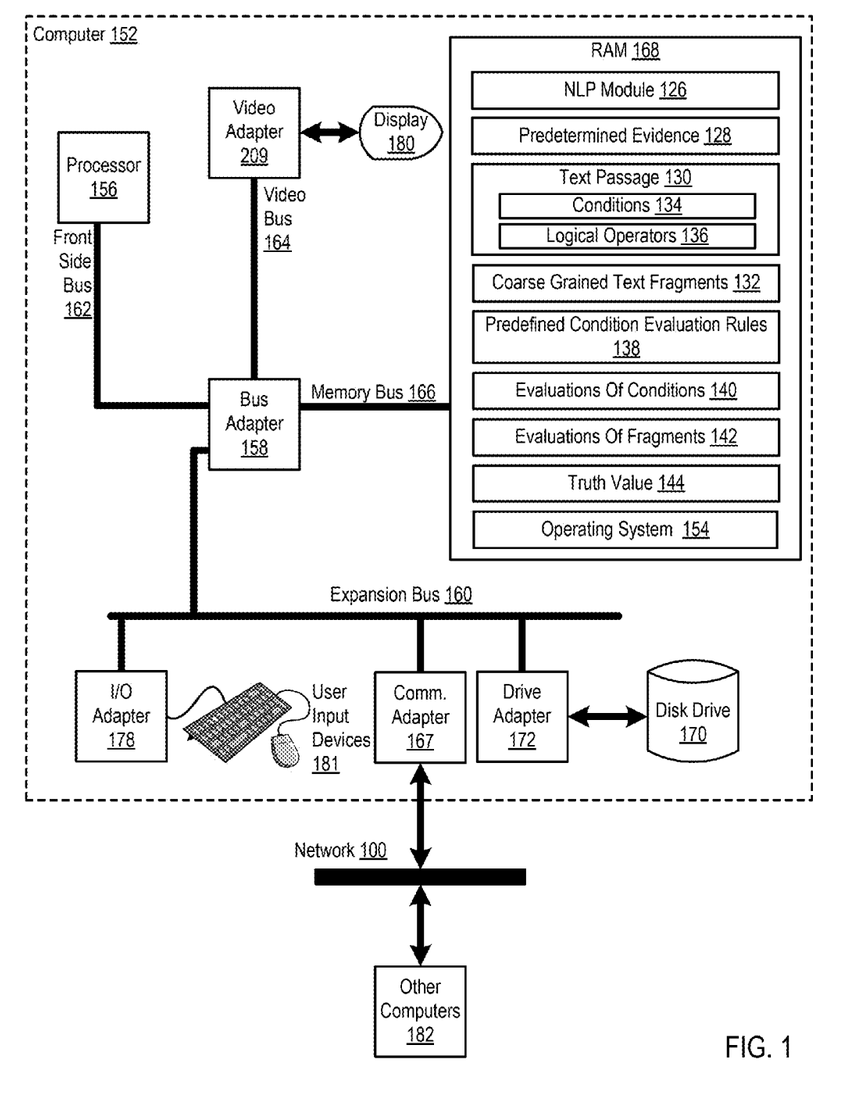
FIG. 1 sets forth a network diagram of a system for natural language processing according to embodiments of the present invention.

Exemplary methods, apparatus, and products for natural language processing in accordance with the present invention are described with reference to the accompanying drawings, beginning with FIG. 1. FIG. 1 sets forth a network diagram of a system for natural language processing ('NLP') according to embodiments of the present invention. NLP relates to a field of computer science and linguistics concerned with the interactions between computers and human (natural) languages. NLP as a field of computer science began as a branch of artificial intelligence. Modern NLP algorithms are grounded in machine learning, especially statistical machine learning.

The system of FIG. 1 includes automated computing machinery comprising an exemplary computer (152) useful in natural language processing according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an NLP module (126) a module of computer program instructions that, when executed, cause the computer (152) to perform natural language processing according to embodiments of the present invention by receiving, by the NLP module (126), text specifying predetermined evidence (128). An example of text specifying predetermined evidence is a data structure that includes a description of a medical patient's test results, current condition, blood pressure, heartbeat, diagnosis, and so on. As described below in further detail, this 'evidence' may be compared to criteria to determine if the evidence meets the criteria. The predetermined evidence (128) may be received from various entities in various ways, including, for example, from a user through a graphical user interface ('GUI') presented on the display (180) of the computer (152) or from a user through a website provided to the user for the purpose of gathering and compiling such evidence. The NLP module (126) may also receive the predetermined evidence (128) from a database or the like.

The NLP module (126) is also configured to receive a text passage (130) to process. In the system of FIG. 1, the text passage (130) comprises criteria for evidence—standards against which evidence may be measured or otherwise compared. The text passage (130) in the example of FIG. 1 includes conditions (134) and logical operators (136). The term 'condition' as used in this specification refers to a qualification or requirement. The term logical operator, or 'logical connective,' is a symbol or word used to connect two or more clauses of sentences in a grammatically valid way, such that a compound sentence produced by the connection has a truth value dependent on the respective truth values of the original clauses. In the example text passage (130), a logical operator (136) couples two or more conditions (134). IN some embodiments, the text passage (130) comprises medical criteria for determining necessity of a medical procedure.

For further explanation, turn briefly to FIG. 5 which sets forth an example text passage (130) to be processed by natural language processing according to embodiments of the present invention. In the example text passage (130) of FIG. 5, each line is numbered for ease of reference. The text passage represents criteria that must be met in order for a medical insurance company to reimburse an insured patient for gene expression profiling as a technique of managing the treatment of cancer. The text passage (130) of FIG. 5 includes many conditions and logical operators. Consider, as an examples of conditions, line 4 of the text passage (130) of FIG. 5 which sets forth two conditions: "individual has had surgery" and "full pathological evaluation of the specimen has been completed." Joining or connecting those two conditions in line 4 of the text passage (130) of FIG. 5 is the logical operator 'and'. To fully meet the criteria of line 4, therefore, both conditions must be met.

Returning now to FIG. 1, the NLP Module (126), after receiving the text passage (130), may decompose the text passage (130) into coarse grained text fragments (132). The NLP module may decompose the text passage into coarse grained text fragments by grouping text segments in dependence upon the logical operators (136).

The NLP Module (126) then analyzes each coarse grained text fragment (132) to identify conditions (134) within the coarse grained text fragment (132) and evaluates each identified condition in accordance with the predetermined evidence and predefined condition evaluation rules. Predefined condition evaluation rules specify a manner in which to evaluate a condition in light of evidence. More specifically, the predefined condition evaluation rules, in some embodiments, may specify values to assign conditions in light of evidence. In some cases, evidence may clearly satisfy a given condition. For example, the evidence may suggest that a patient is male and the condition may require that a patient is male. In this case, predefined condition evaluation rules may specify a value of 1 (or 100%) may be assigned to the evaluation of that condition. In other cases, however, the evidence may not so clearly satisfy a condition. Consider, for example, a condition requiring a blood pressure measurement of a patient between 90/65-119/70 and evidence show 95/59. Here, the predefined condition evaluation rules (138) may specify some value less than 1, say 0.85, to assign to the evaluation of the condition.

After evaluating each identified condition, the NLP module (126) evaluates each coarse grained text fragment in dependence upon the identified condition evaluations (140) and the logical operators of the coarse grained text fragment. That is, the NLP module determines whether the coarse grained text fragment is true in light of the logical operators and evaluations of the condition of the text fragment. Consider, for example, a coarse grained text fragment that specifies two conditions "patient is male" and "patient is over 25 years of age" and in which the logical operator is an "and" operator. Consider, further, that the predetermined evidence (128) specifies a male patient of 30 years old. In evaluating the conditions, the NLP module may determine that each condition is true, assigning a value of 1 to each condition. In evaluating the coarse grained text fragment as a whole, the NLP module determines whether the fragment is true in light of the logical operator. That is, the NLP module (126) determines whether the statement: 1 AND 1 is true. In this example, the NLP module determines that the coarse grained text fragment is true. In the same way the NLP module assigns a value to the evaluation of the conditions, the NLP module may also assign a value to the evaluation of coarse grained text fragments.

Figure 6:
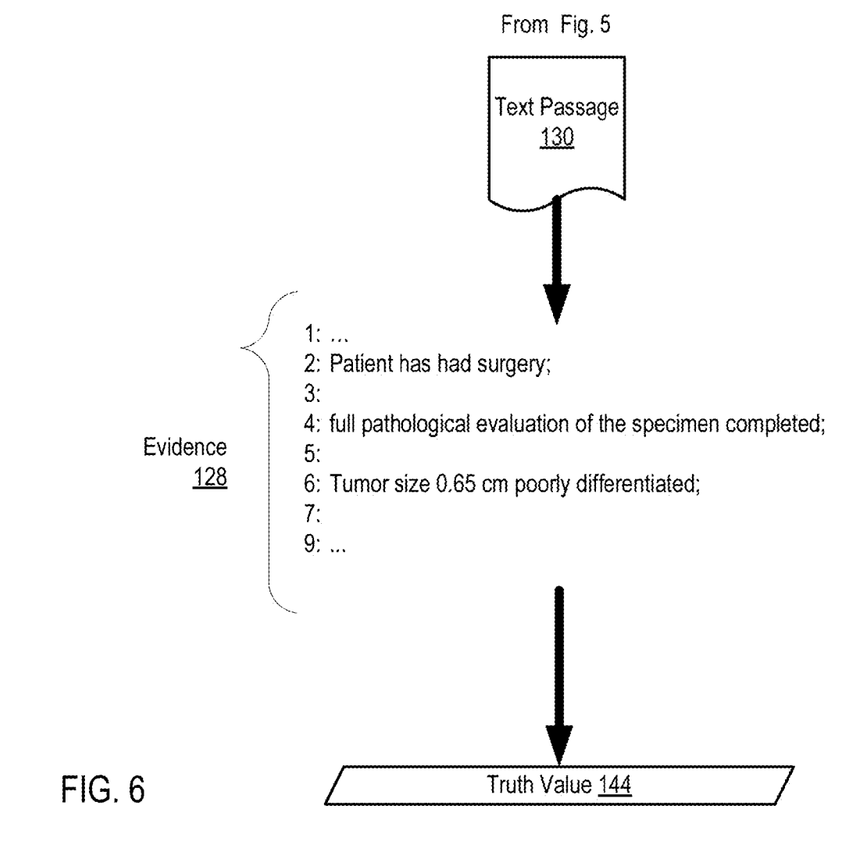
FIG. 6 sets forth a portion of evidence used in evaluating identified conditions and coarse grained text fragments of a text passage in accordance with embodiments of the present invention.

For further explanation, the example of FIG. 6 sets forth a portion of evidence (128) used in evaluating identified conditions and coarse grained text fragments of the example text passage (130) of FIG. 5 in accordance with embodiments of the present invention. The example of FIG. 6 sets forth only a portion of evidence for clarity of explanation, but readers of skill in the art will recognize that any amount of evidence may be used to evaluate conditions and coarse grained text fragments. The example evidence (128) of FIG. 6 specifies that a patient has had surgery, a full pathological evaluation of a specimen has been completed, and the patient has a poorly differentiated tumor of 0.65 centimeters (cm). When an NLP module evaluates identified condition of the text passage (130) in accordance with the predetermined evidence of FIG. 6, the NLP module may assign a score of 1 to the condition "individual has had surgery" in line 4 of the example text passage (130) of FIG. 5 and a score of 1 to the condition "full pathological evaluation of the specimen has been completed" in line 4 of the example text passage (130) of FIG. 5. Rules may specify that the condition "tumor size 0.6-1.0 cm moderate/poorly differentiated" in line 21 of the example text passage of FIG. 5 be assigned a score of 0.7 for evidence that indicates a poorly differentiated 0.65 cm tumor. In evaluating coarse grained text fragments—such as the coarse grained text fragment in line 4 of FIG. 5—the NLP module may average the scores of the conditions in light of the logical operator. In this example, the average is 1. This may be repeated for each coarse grained text fragment, followed by an average of all coarse grained text fragment scores. The final average of all coarse grained text fragment scores may be considered a truth value (144) of the text passage in light of the evidence.

Returning now to FIG. 1, the NLP module (126) may calculate a truth value (144) that indicates a degree to which the predetermined evidence (128) meets the criteria of the text passage (130). Such calculation may be carried out in dependence upon the evaluations (142) of each coarse grained text fragment. For example, a truth value may be calculated as an average of all evaluations (142) of the coarse grained text fragments. Further, in some cases coarse grained text fragments are also coupled by logical operators. In such an embodiment, a truth value may be calculated by first evaluating the veracity of coarse grained text fragments coupled by logical operators and averaging these values along with the values of coarse grain text fragment evaluations.

Also stored in RAM (168) is an operating system (154). Operating systems useful natural language processing according to embodiments of the present invention include UNIX™ Linux™ Microsoft XP™ AIX™ IBM's i5/OS™ and others as will occur to those of skill in the art. The operating system (154), NLP module (126), text passage (130), predetermined evidence (128), predefined condition evaluation rules (138) and the like in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for natural language processing according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for natural language processing according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
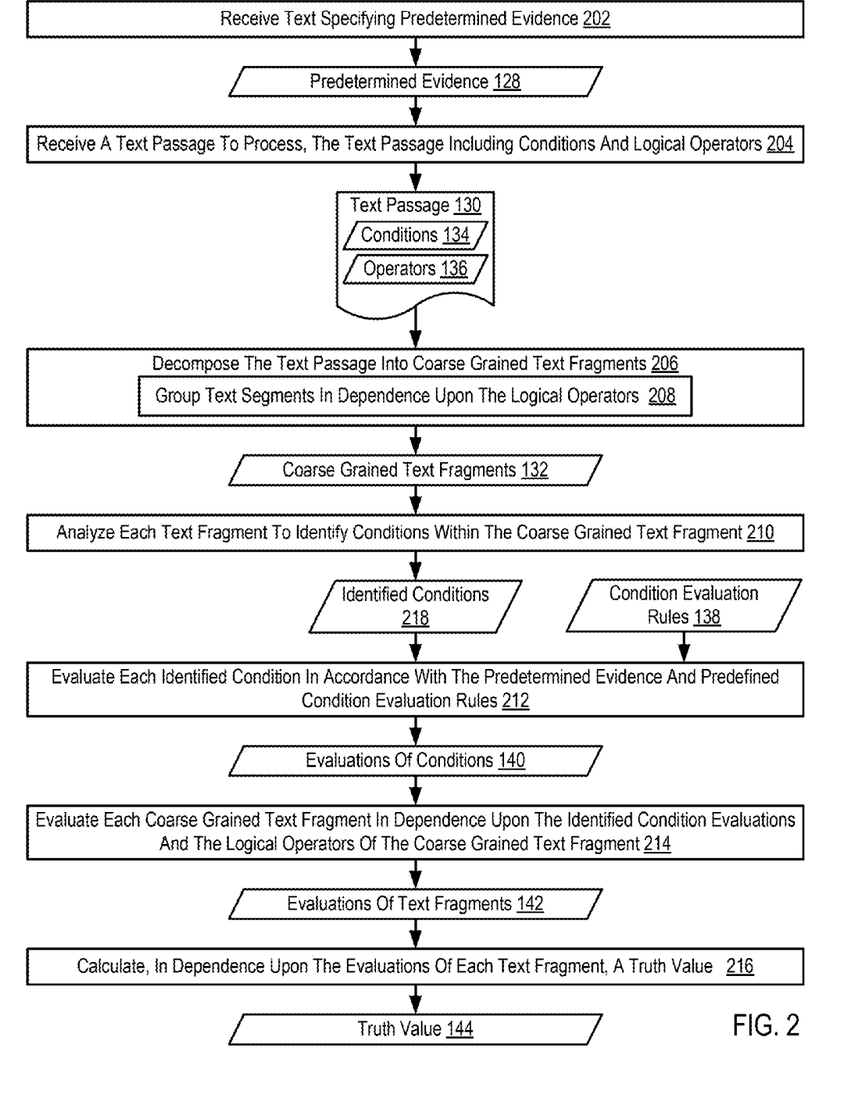
FIG. 2 sets forth a flow chart illustrating an exemplary method for natural language processing according to embodiments of the present invention.

For further explanation, FIG. 2 sets forth a flow chart illustrating an exemplary method for natural language processing according to embodiments of the present invention. The method of FIG. 2 includes receiving (202), by an NLP module, text specifying predetermined evidence (128). Receiving (202), by an NLP module, text specifying predetermined evidence (128) may be carried out in various ways, including, for example, receiving the text specifying the predetermined evidence (128) from a user through a graphical user interface ('GUI') presented on the display (180), receiving the text specifying the predetermined evidence (128) from a user through a website provided to the user for the purpose of gathering and compiling such evidence, receiving (202) the predetermined evidence (128) from a database, and so on as will occur to readers of skill in the art.

The method of FIG. 2 also includes receiving (204), by the NLP module, a text passage (130) to process. In the method of FIG. 2, the text passage (130) includes conditions (134) and logical operators (136). Also in the method of FIG. 2, the text passage (130) implements—or said other ways 'specifies' or 'represents'—criteria for evidence. Receiving (204) a text passage (130) to process may be carried out in many of the same ways that receiving (202) text specifying predetermined evidence (128) may be carried out: through a GUI, through a website, from a database upon request, through email, and via some other user input as will occur to readers of skill in the art.

The method of FIG. 2 also includes decomposing (206), by the NLP module, the text passage (130) into coarse grained text fragments (132). In the method of FIG. 2, decomposing (206) the text passage (130) is carried out by grouping (208) text segments as coarse grained text fragments in dependence upon the logical operators. That is, decomposing (206) the text passage (130) into coarse grained text fragments (132) may be carried out by scanning the text passage from beginning to end, identifying text segments that may be grouped into a coarse grained fragment based on the location of logical operators within the text segment.

The method of FIG. 2 also includes analyzing (210), by the NLP module, each coarse grained text fragment (132) to identify conditions within the coarse grained text fragment. The NLP module may analyze (21) text fragments (132) to identify conditions in light of a condition ruleset that specifies characteristics of phrases and text to consider. Consider, for example, that such a condition ruleset specifies that catch-phrases such as "less than," "greater than," "at least," "no more than," and the like, indicate a condition. Other example triggers may include presence of a diagnosis, medication, or a medical device referenced within the text fragment.

Figure 4:
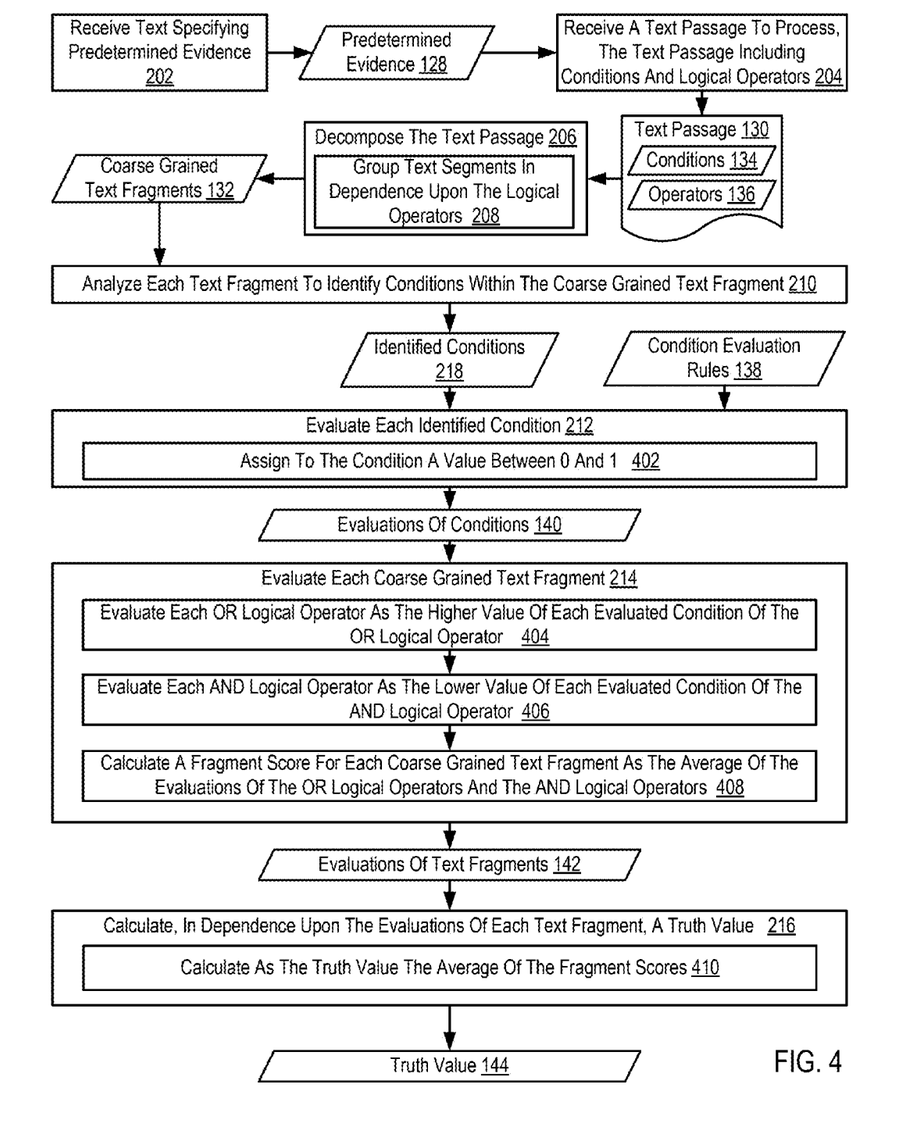
FIG. 4 sets forth a flow chart illustrating another exemplary method for natural language processing according to embodiments of the present invention.

The method of FIG. 2 also includes evaluating (212), by the NLP module, each identified condition (218) in accordance with the predetermined evidence (128) and predefined condition evaluation rules (138) and then evaluating (214) each coarse grained text fragment (132) in dependence upon the identified condition evaluations (140) and the logical operators (136) of the coarse grained text fragment (132). Finally, the method of FIG. 2 also includes calculating (216) a truth value (144). In the method of FIG. 2, the truth value indicates a degree to which the evidence (128) meets the criteria of the text passage (130). FIG. 4, described below, sets forth fuller explanation of the evaluations (212 and 214) and the calculation (216) of the truth value.

Figure 3:
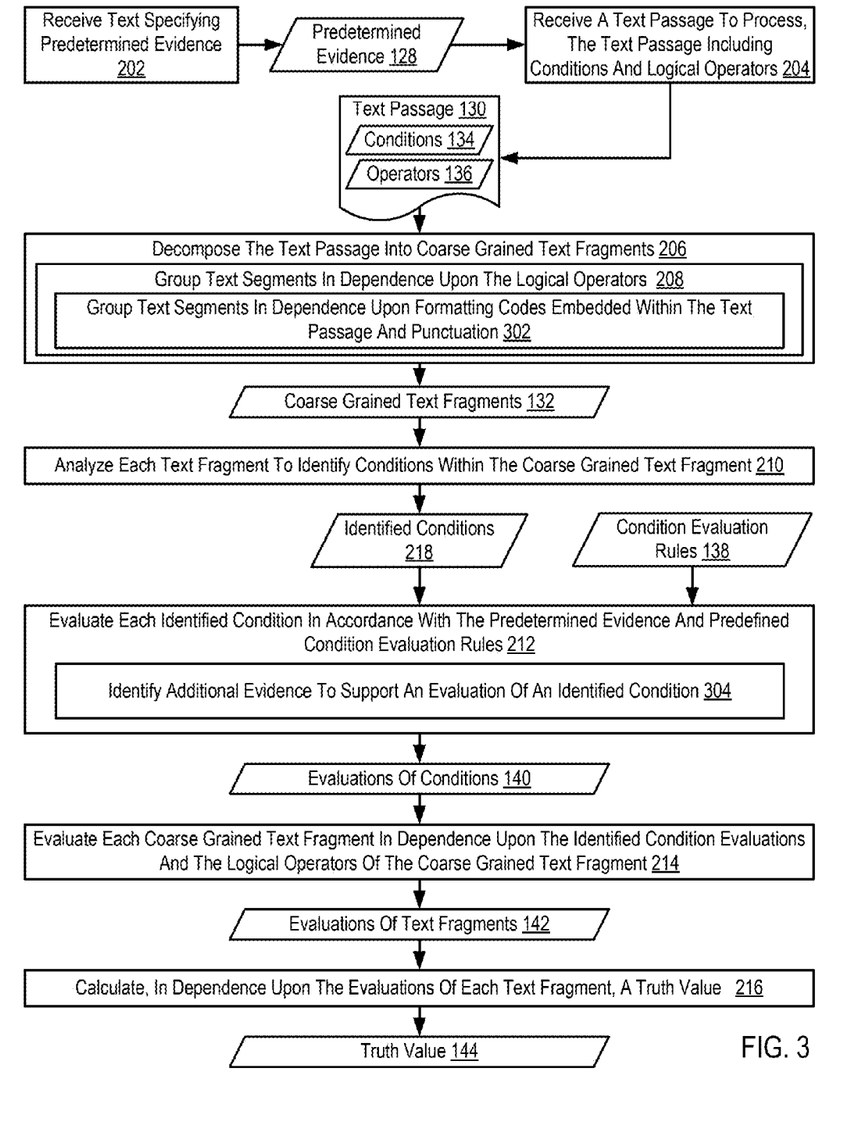
FIG. 3 sets forth a flow chart illustrating another exemplary method for natural language processing according to embodiments of the present invention.

For further explanation, FIG. 3 sets forth a flow chart illustrating another exemplary method for natural language processing according to embodiments of the present invention. The method of FIG. 3 is similar to the method of FIG. 2 in that the method of FIG. 3 also includes: receiving (202) text specifying predetermined evidence; receiving (204) a text passage to process; decomposing (206) the text passage into coarse grained text fragments; analyzing (210) each coarse grained text fragment to identify conditions; evaluating (212) each identified condition; and evaluating (214) each coarse grained text fragment; and calculating (216) a truth value.

The method of FIG. 3 differs from the method of FIG. 2, however, in that in the method of FIG. 3 grouping (208) text segments as coarse grained text fragments in dependence upon the logical operators also includes grouping (302) text segments as coarse grained text fragments in dependence upon formatting codes embedded within the text passage and punctuation. That is, in addition to the logical operators, a coarse grained text fragment may also be identified in the text passage through use of formatting codes—paragraph markers, font styles, indentions, tabs and the like—as well through use of punctuation—periods, commas, hyphens, semicolons, colons, and the like. Such formatting and punctuation often indicates structure to the text fragments. Utilizing such structure to decompose the text passage into coarse grained fragments increases the likelihood that conditions and logical operators within the coarse grained fragments are coupled (and thus evaluated) in a sensible and useful manner—that is, as the author of the text passage intended the conditions and logical operators to be coupled and evaluated.

Also in the method of FIG. 3, evaluating (212) each identified condition in accordance with the predetermined evidence and predefined condition evaluation rules includes identifying (304) additional evidence to support an evaluation of an identified condition. When evaluating a condition, the condition is compared to evidence specified in the predetermined evidence (128). In some cases, the evidence may be incomplete with regard to a condition of the text passage. Consider, for example, that a coarse grained text fragment (132) of the text passage (130) includes an identified condition (218) that specifies "patient is under 30 years of age," while the predetermined evidence does not include an age of the patient. In such an example, the NLP module may identify that evidence relating to the age of the patient is necessary to evaluate the condition accurately. The NLP module may notify the provider of the predetermined evidence (128) that such additional evidence is needed. The NLP module may also assign an evaluation of the identified condition that lacks some amount of evidence to support a complete evaluation some predetermined value such as 0, 0.1, 0.5, or the like. In some cases, for example, a user may prefer for neutral value to be assigned to a condition missing some evidence such that an overall truth value may still be generated, but the lack of evidence does not cause the truth value to be weighted—negatively or positively—based on the evaluation of that condition.

For further explanation, FIG. 4 sets forth a flow chart illustrating another exemplary method for natural language processing according to embodiments of the present invention. The method of FIG. 4 is similar to the method of FIG. 2 in that the method of FIG. 4 also includes: receiving (202) text specifying predetermined evidence; receiving (204) a text passage to process; decomposing (206) the text passage into coarse grained text fragments; analyzing (210) each coarse grained text fragment to identify conditions; evaluating (212) each identified condition; and evaluating (214) each coarse grained text fragment; and calculating (216) a truth value.

The method of FIG. 4 differs from the method of FIG. 3, however, in that in the method of FIG. 3, evaluating (212) the identified condition in accordance with the predetermined evidence and predefined evaluation criteria is carried out by assigning (402) to the condition a value between 0 and 1. In the method off FIG. 3, a value of 1 represents evidence fully satisfying the condition and a value of 0 represents evidence that does not satisfy the condition.

Also in the method of FIG. 4, evaluating (214) each coarse grained text fragment in dependence upon the identified condition evaluations and the logical operators of the coarse grained text fragment is carried out by: evaluating (404) each OR logical operator as the higher value of each evaluated condition of the OR logical operator; evaluating (406) each AND logical operator as the lower value of each evaluated condition of the AND logical operator; and calculating (408) a fragment score for each coarse grained text fragment as the average of the evaluations of the OR logical operators and the AND logical operators of the coarse grained text fragment. And calculating (216) a truth value in the method of FIG. 4 includes calculating (410) as the truth value the average of the fragment scores.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for natural language processing ('NLP'), the apparatus comprising a computer processor, a computer memory operatively coupled to the computer processor and the computer memory having disposed within it computer program instructions that, when executed by the processor, cause the apparatus to carry out the steps of:
   receiving, by an NLP module, the NLP module including automated computing machinery configured for NLP, text specifying predetermined evidence;
   receiving, by the NLP module, a text passage to process, the text passage including conditions and logical operators, the text passage comprising criteria for evidence;
   decomposing, by the NLP module, the text passage into coarse grained text fragments, including grouping text segments as coarse grained text fragments in dependence upon the logical operators;
   analyzing, by the NLP module, each coarse grained text fragment to identify conditions within the coarse grained text fragment;
   evaluating, by the NLP module, each identified condition in accordance with the predetermined evidence and predefined condition evaluation rules;
   evaluating, by the NLP module, each coarse grained text fragment in dependence upon the identified condition evaluations and the logical operators of the coarse grained text fragment including:
      evaluating each OR logical operator as the higher value of each evaluated condition of the OR logical operator;
      evaluating each AND logical operator as the lower value of each evaluated condition of the AND logical operator; and
      calculating a fragment score for each coarse grained text fragment as the average of the evaluations of the OR logical operators and the AND logical operators of the coarse grained text fragment; and
   calculating, by the NLP module in dependence upon the evaluations of each coarse grained text fragment, a truth value indicating a degree to which the evidence meets the criteria of the text passage.

2. The apparatus of claim 1 wherein grouping text segments as coarse grained text fragments in dependence upon the logical operators further comprises:
   grouping text segments as coarse grained text fragments in dependence upon formatting codes embedded within the text passage and punctuation.

3. The apparatus of claim 1 wherein evaluating each identified condition in accordance with the predetermined evidence and predefined condition evaluation rules further comprises identifying additional evidence to support an evaluation of an identified condition.

4. The apparatus of claim 1 wherein evaluating the identified condition in accordance with the predetermined evidence and predefined evaluation criteria further comprises assigning to the condition a value between 0 and 1, where a value of 1 represents evidence satisfying the condition and a value of 0 represents evidence not satisfying the condition.

5. The apparatus of claim 1 wherein calculating, in dependence upon the evaluations of each coarse grained text fragment, a truth value indicating a degree to which the evidence meets the criteria of the text passage further comprises calculating as the truth value the average of the fragment scores.

6. The apparatus of claim 1 wherein the text passage comprises medical criteria for necessity of a medical procedure.

7. A computer program product for natural language processing ('NLP'), the computer program product disposed upon a computer readable storage medium, wherein the computer readable storage medium is not a signal, the computer program product comprising computer program instructions that, when executed, cause a computer to carry out the steps of:
 receiving, by an NLP module, the NLP module including automated computing machinery configured for NLP, text specifying predetermined evidence;
 receiving, by the NLP module, a text passage to process, the text passage including conditions and logical operators, the text passage comprising criteria for evidence;
 decomposing, by the NLP module, the text passage into coarse grained text fragments, including grouping text segments as coarse grained text fragments in dependence upon the logical operators;
 analyzing, by the NLP module, each coarse grained text fragment to identify conditions within the coarse grained text fragment;
 evaluating, by the NLP module, each identified condition in accordance with the predetermined evidence and predefined condition evaluation rules;
 evaluating, by the NLP module, each coarse grained text fragment in dependence upon the identified condition evaluations and the logical operators of the coarse grained text fragment including:
  evaluating each OR logical operator as the higher value of each evaluated condition of the OR logical operator;
  evaluating each AND logical operator as the lower value of each evaluated condition of the AND logical operator; and
  calculating a fragment score for each coarse grained text fragment as the average of the evaluations of the OR logical operators and the AND logical operators of the coarse grained text fragment; and
 calculating, by the NLP module in dependence upon the evaluations of each coarse grained text fragment, a truth value indicating a degree to which the evidence meets the criteria of the text passage.

8. The computer program product of claim 7 wherein grouping text segments as coarse grained text fragments in dependence upon the logical operators further comprises:
 grouping text segments as coarse grained text fragments in dependence upon formatting codes embedded within the text passage and punctuation.

9. The computer program product of claim 7 wherein evaluating each identified condition in accordance with the predetermined evidence and predefined condition evaluation rules further comprises identifying additional evidence to support an evaluation of an identified condition.

10. The computer program product of claim 7 wherein evaluating the identified condition in accordance with the predetermined evidence and predefined evaluation criteria further comprises assigning to the condition a value between 0 and 1, where a value of 1 represents evidence satisfying the condition and a value of 0 represents evidence not satisfying the condition.

11. The computer program product of claim 7 wherein calculating, in dependence upon the evaluations of each coarse grained text fragment, a truth value indicating a degree to which the evidence meets the criteria of the text passage further comprises calculating as the truth value the average of the fragment scores.

* * * * *